(12) United States Patent
Yuan et al.

(10) Patent No.: US 12,414,120 B2
(45) Date of Patent: Sep. 9, 2025

(54) MULTIPLE UPLINK CONFIGURATIONS FOR MULTIPLE ANTENNA PANEL TRANSMISSIONS

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/906,945

(22) PCT Filed: May 13, 2020

(86) PCT No.: PCT/CN2020/089957
§ 371 (c)(1),
(2) Date: Sep. 21, 2022

(87) PCT Pub. No.: WO2021/226861
PCT Pub. Date: Nov. 18, 2021

(65) Prior Publication Data
US 2023/0127731 A1    Apr. 27, 2023

(51) Int. Cl.
*H04W 72/21*    (2023.01)
*H04L 5/00*    (2006.01)

(52) U.S. Cl.
CPC .......... *H04W 72/21* (2023.01); *H04L 5/0053* (2013.01)

(58) Field of Classification Search
CPC ... H04W 72/21; H04W 72/23; H04W 52/262; H04L 5/0053; H04L 5/0051; H04L 25/03891; H04L 5/0044; H04L 5/0094; H04L 5/0048; H04B 7/024; H04B 7/0456
See application file for complete search history.

(56) References Cited

U.S. PATENT DOCUMENTS

| | | | |
|---|---|---|---|
| 2018/0234960 A1 | 8/2018 | Nagaraja et al. | |
| 2022/0007410 A1* | 1/2022 | Cirik | H04W 72/1273 |
| 2022/0400471 A1* | 12/2022 | Hu | H04L 5/0048 |

(Continued)

FOREIGN PATENT DOCUMENTS

| | | |
|---|---|---|
| CN | 110536435 A | 12/2019 |
| CN | 110710281 A | 1/2020 |
| CN | 110741592 A | 1/2020 |

(Continued)

OTHER PUBLICATIONS

CATT: "Considerations on UL Beam Management", R1-1710057, 3GPP TSG RAN WG1 NR Ad-Hoc#2, Qingdao, P.R. China, Jun. 27-30, 2017, Jun. 30, 2017, 4 Pages, section 2.

(Continued)

*Primary Examiner* — Yaotang Wang
(74) *Attorney, Agent, or Firm* — Harrity & Harrity, LLP

(57) ABSTRACT

A user equipment may receive a first physical uplink shared channel (PUSCH) configuration and a second PUSCH configuration. The user equipment may transmit a first uplink communication and a second uplink communication using different antenna panels, based at least in part on the first PUSCH configuration and the second PUSCH configuration.

20 Claims, 9 Drawing Sheets

(56) References Cited

U.S. PATENT DOCUMENTS

2023/0189254 A1* 6/2023 Go .......................... H04B 7/06
370/329

FOREIGN PATENT DOCUMENTS

| CN | 110769502 A | 2/2020 |
|----|----|----|
| EP | 3927061 A1 | 12/2021 |
| WO | WO-2019029744 A1 | 2/2019 |

OTHER PUBLICATIONS

CATT: "Remaining Details on Beam Management", R1-1800241, 3GPP TSG RAN WG1 Meeting AH 1801, Vancouver, Canada, Jan. 22-26, 2018, Jan. 26, 2018, 3 Pages, section 3.

HUAWEI., et al., "Discussion on UL Multi-Panel/TRP Operation", R1-1714345, 3GPP TSG RAN WG1 Meeting #90, Prague, Czech Republic, Aug. 21-25, 2017, Aug. 25, 2017, 5 Pages, section 2.

International Search Report and Written Opinion—PCT/CN2020/089957—ISA/EPO—Feb. 18, 2021.

SAMSUNG: "Enhancements on MIMO for NR", RP-192434, 3GPP TSG RAN Meeting #86, Sitges, RP-192434, 3rd Generation Partnership Project, Mobile Competence Centre, 650, Route Des Lucioles, F-06921 Sophia-Antipolis Cedex ,France, vol. TSG RAN, No. Sitges, Spain, Dec. 9, 2019-Dec. 12, 2019, Dec. 2, 2019, 28 Pages, p. 11-p. 14.

Supplementary European Search Report—EP20935217—Search Authority—The Hague—Dec. 21, 2023.

* cited by examiner

MULTIPLE UPLINK CONFIGURATIONS FOR MULTIPLE ANTENNA PANEL TRANSMISSIONS

CROSS-REFERENCE TO RELATED APPLICATION

This Patent Application is a 371 national stage of PCT Application No. PCT/CN2020/089957 filed on May 13, 2020, entitled "MULTIPLE UPLINK CONFIGURATIONS FOR MULTIPLE ANTENNA PANEL TRANSMISSIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multiple uplink configurations for multiple antenna panel transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a first physical uplink shared channel (PUSCH) configuration and a second PUSCH configuration; and transmitting a first uplink communication and a second uplink communication using different antenna panels, based at least in part on the first PUSCH configuration and the second PUSCH configuration.

In some aspects, a method of wireless communication, performed by a base station, may include determining a first PUSCH configuration and a second PUSCH configuration for a UE; and transmitting the first PUSCH configuration and the second PUSCH configuration to the UE to enable the UE to transmit a first uplink communication and a second uplink communication using different antenna panels, based at least in part on the first PUSCH configuration and the second PUSCH configuration.

In some aspects, a user equipment for wireless communication may include a memory and one or more processors operatively coupled to the memory. The memory and the one or more processors may be configured to receive a first PUSCH configuration and a second PUSCH configuration; and transmit a first uplink communication and a second uplink communication using different antenna panels, based at least in part on the first PUSCH configuration and the second PUSCH configuration.

In some aspects, a base station for wireless communication may include a memory and one or more processors operatively coupled to the memory. The memory and the one or more processors may be configured to determine a first PUSCH configuration and a second PUSCH configuration for a UE; and transmit the first PUSCH configuration and the second PUSCH configuration to the UE to enable the UE to transmit a first uplink communication and a second uplink communication using different antenna panels, based at least in part on the first PUSCH configuration and the second PUSCH configuration.

In some aspects, a non-transitory computer-readable medium may store one or more instructions for wireless communication. The one or more instructions, when executed by one or more processors of a UE, may cause the one or more processors to receive a first PUSCH configuration and a second PUSCH configuration; and transmit a first uplink communication and a second uplink communication using different antenna panels, based at least in part on the first PUSCH configuration and the second PUSCH configuration.

In some aspects, a non-transitory computer-readable medium may store one or more instructions for wireless communication. The one or more instructions, when executed by one or more processors of a base station, may cause the one or more processors to determine a first PUSCH configuration and a second PUSCH configuration for a UE; and transmit the first PUSCH configuration and the second PUSCH configuration to the UE to enable the UE to transmit a first uplink communication and a second uplink communication using different antenna panels, based at least in part on the first PUSCH configuration and the second PUSCH configuration.

In some aspects, an apparatus for wireless communication may include means for receiving a first PUSCH configuration and a second PUSCH configuration; and means for transmitting a first uplink communication and a second uplink communication using different antenna panels, based at least in part on the first PUSCH configuration and the second PUSCH configuration.

In some aspects, an apparatus for wireless communication may include means for determining a first PUSCH configuration and a second PUSCH configuration for a UE; and means for transmitting the first PUSCH configuration and the second PUSCH configuration to the UE to enable the UE to transmit a first uplink communication and a second uplink communication using different antenna panels, based at least in part on the first PUSCH configuration and the second PUSCH configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
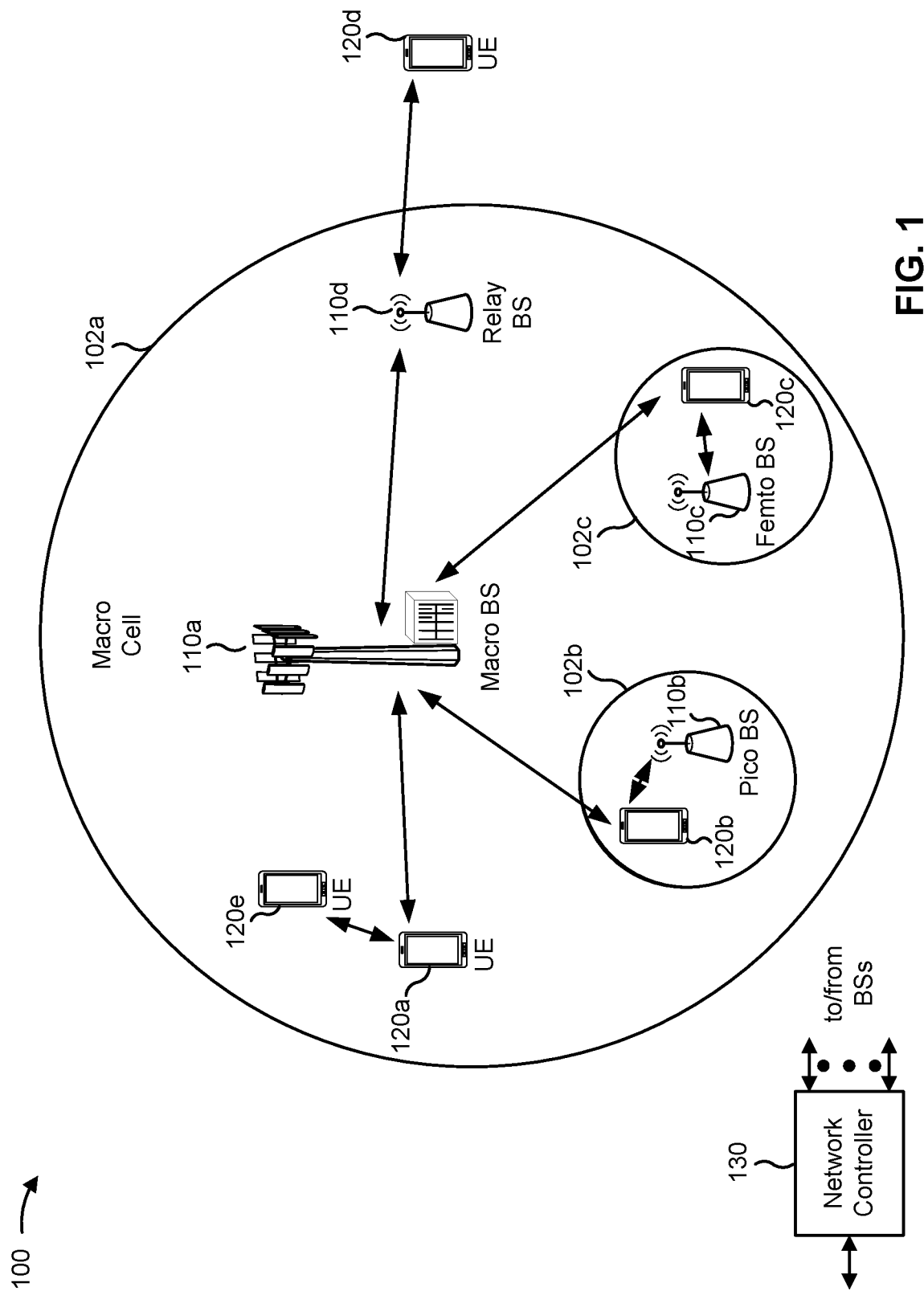
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
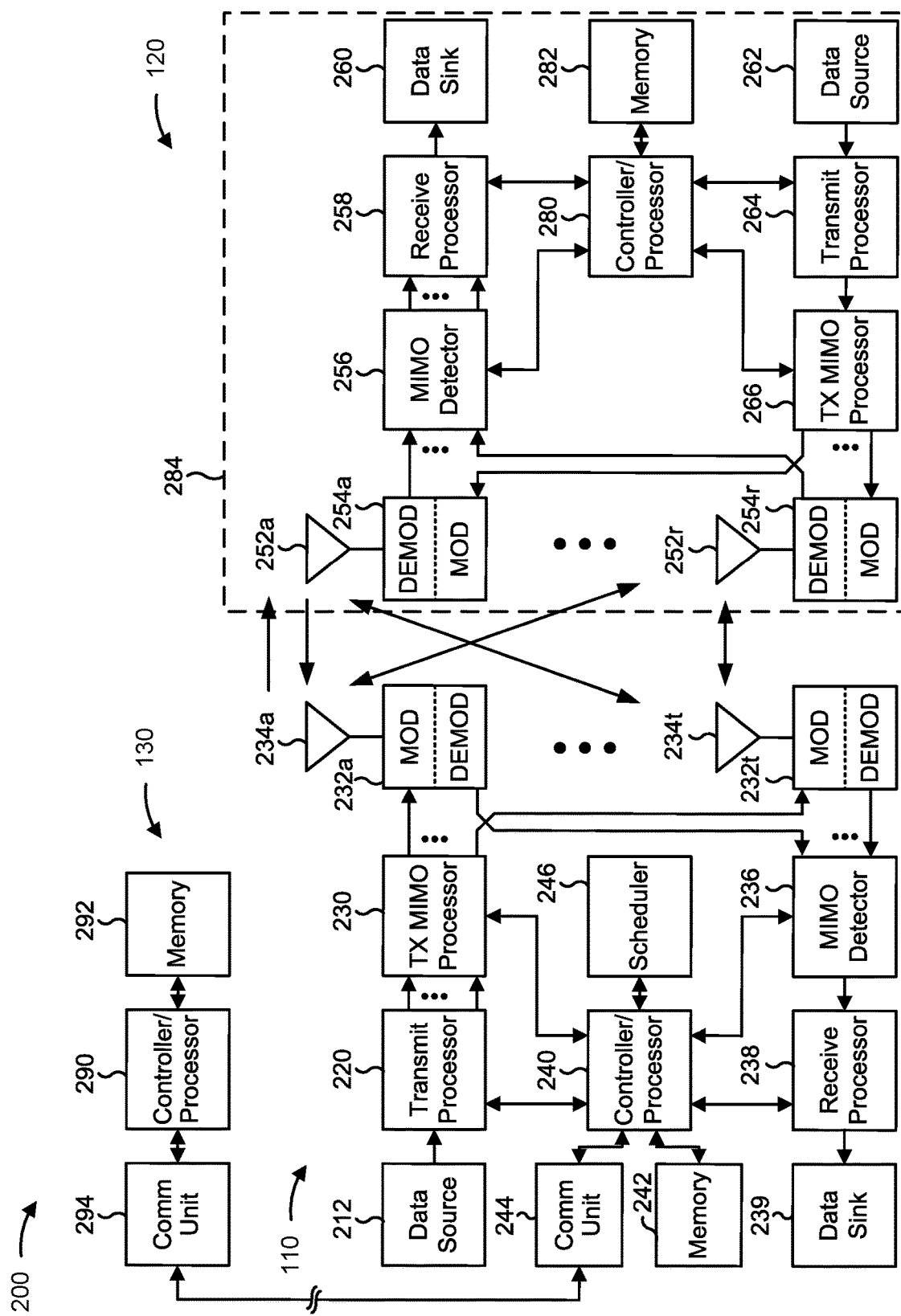
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5, 6A, 6B, 7, and 8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5, 6A, 6B, 7, and 8.

Controller/processor 240 of base station 110, controller/processor 280 of UE 120, and/or any other component(s) of FIG. 2 may perform one or more techniques associated with multiple uplink configurations for multiple antenna panel transmissions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a first PUSCH configuration and a second PUSCH configuration, means for transmitting a first uplink communication and a second uplink communication using different antenna panels, based at least in part on the first PUSCH configuration and the second PUSCH configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 (e.g., a TRP) may include means for determining a first PUSCH configuration and a second PUSCH configuration for a UE (e.g., UE 120), means for transmitting the first PUSCH configuration and the second PUSCH configuration to the UE to enable the UE to transmit a first uplink communication and a second uplink communication using different antenna panels, based at least in part on the first PUSCH configuration and the second PUSCH configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
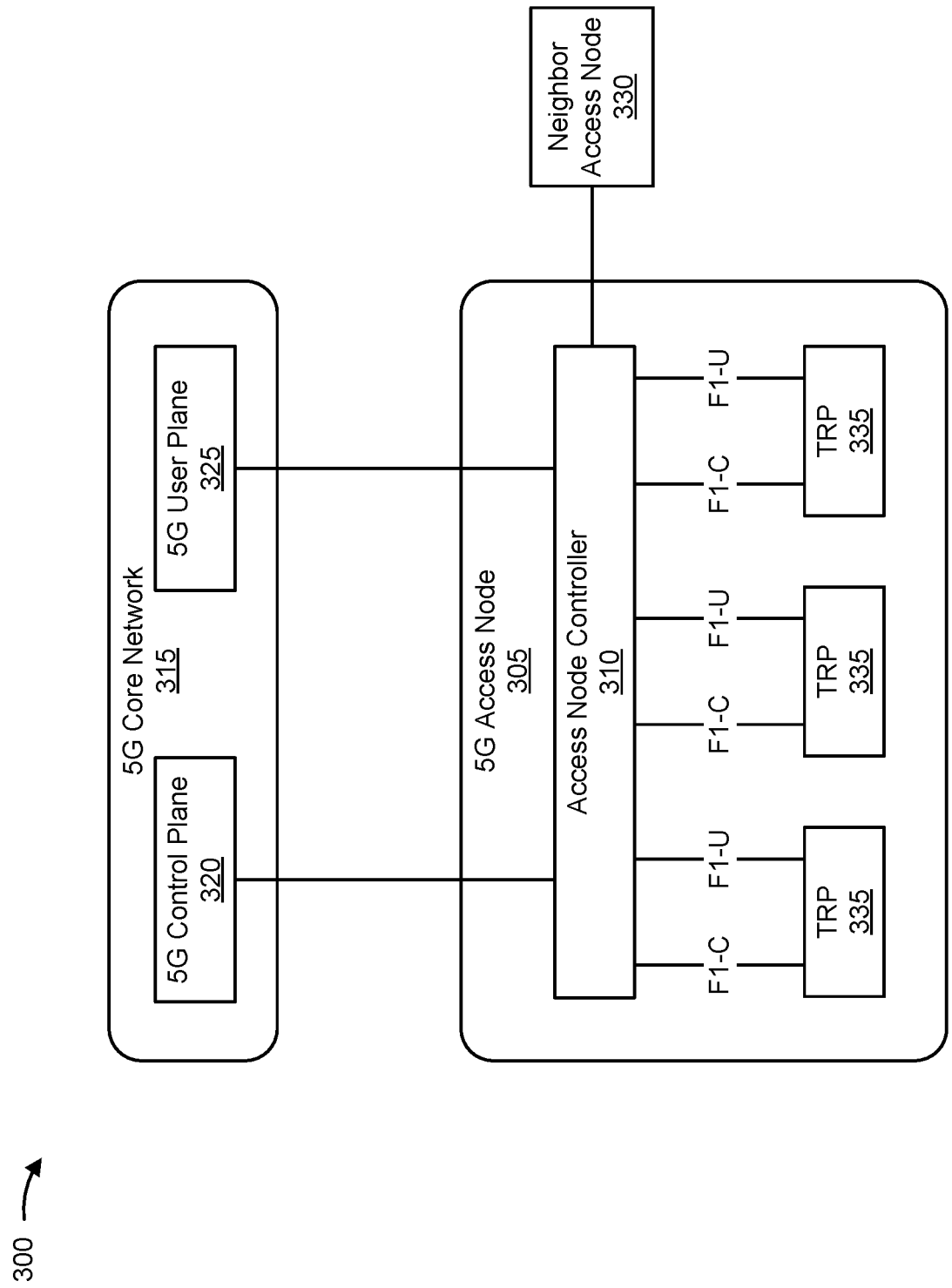
FIG. 3 illustrates an example logical architecture of a distributed radio access network (RAN), according to aspects of the present disclosure.

FIG. 3 illustrates an example logical architecture of a distributed RAN 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
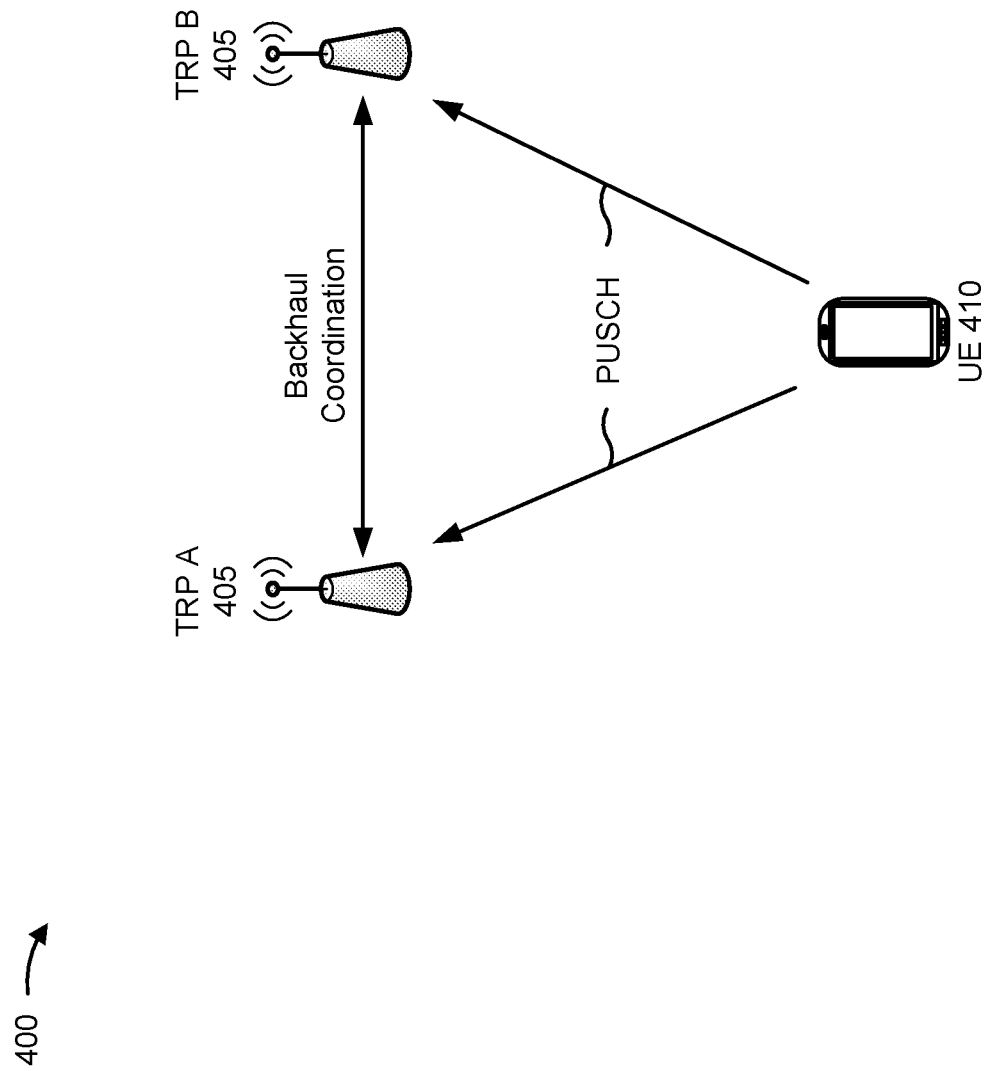
FIG. 4 is a diagram illustrating an example of multiple transmit receive point (multi-TRP) communication, in accordance with various aspects of the present disclosure.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 410. A TRP 405 may correspond to a TRP 335 described above in connection with FIG. 3.

The multiple TRPs 405 (shown as TRP A and TRP B) may communicate with the same UE 410 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 410 using different QCL relationships (e.g., different TCI states), different demodulation reference signal (DMRS) ports, different layers (e.g., of a multi-layer communication), and/or the like.

As indicated above, FIG. 4 is provided as an example. Other examples may differ from what is described with respect to FIG. 4.

Figure 5:
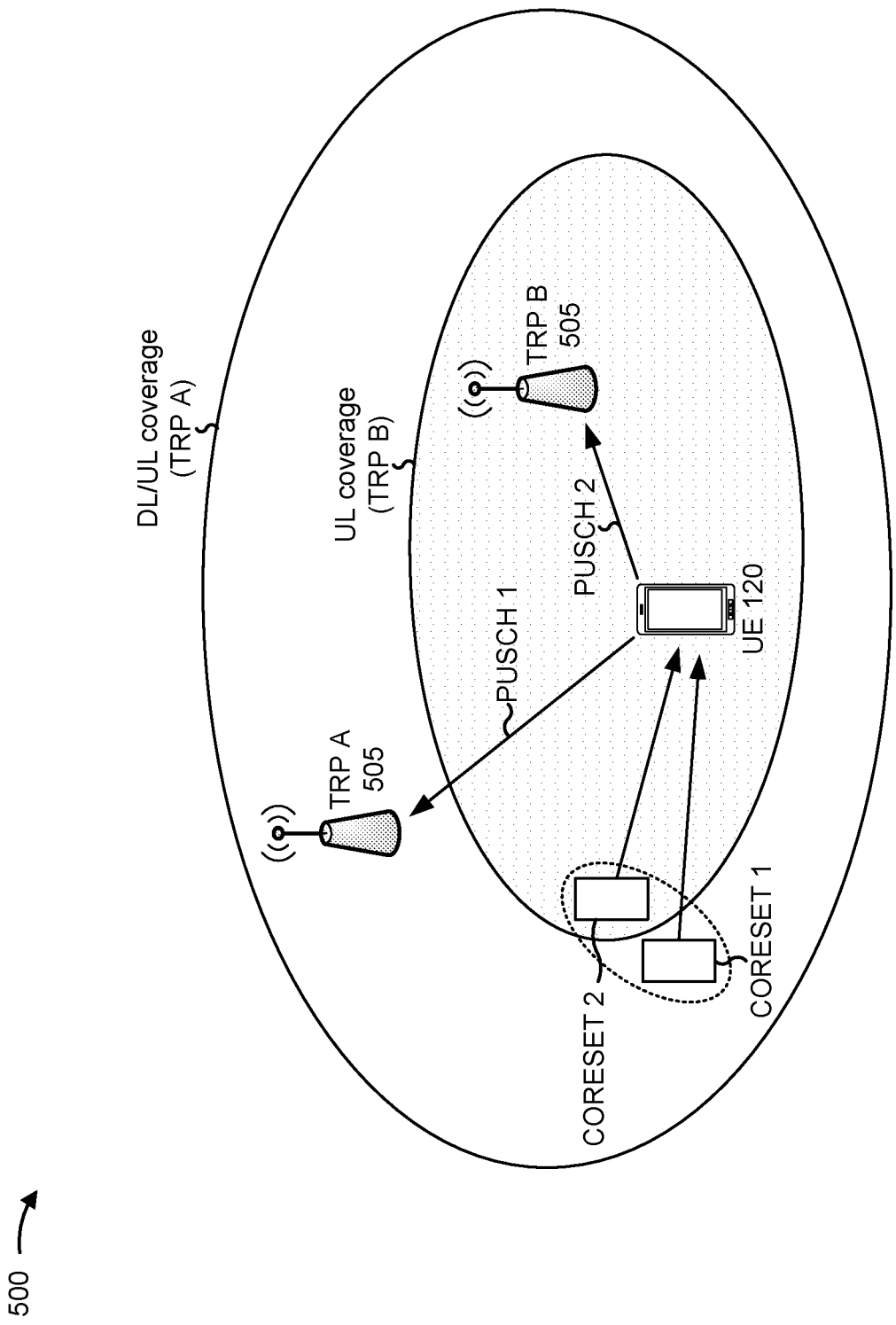
FIG. 5 is a diagram illustrating an example of multiple antenna panel transmissions, in accordance with various aspects of the present disclosure.

FIG. 5 is a diagram illustrating an example 500 of multi-panel uplink transmission, in accordance with various aspects of the present disclosure. As shown in FIG. 5, a UE 120 may communicate with a first TRP (TRP A) 505 and a second TRP (TRP B) 505. The UE 120 may correspond to UE 410 described above in connection with FIG. 4. A TRP 505 may correspond to a TRP 405 described above in connection with FIG. 4.

The first TRP 505 and the second TRP 505 may be co-located at the same base station 110 or may not be co-located. In some aspects, the first TRP 505 and the second TRP 505 are associated with the same serving cell (e.g., the same serving cell identifier). As shown, the first TRP 505 may provide downlink (DL) and uplink (UL) coverage, and the second TRP 505 may provide only UL coverage (e.g., for power saving). However, in some aspects, one or both of the first TRP 505 or the second TRP 505 may provide DL and UL coverage or only UL coverage.

As shown in FIG. 5, the UE 120 may transmit a first PUSCH communication (PUSCH 1) to the first TRP 505 and a second PUSCH communication (PUSCH 2) to the second TRP 505. The first PUSCH communication and the second PUSCH communication may be the same communication or different communications. In some aspects, the UE 120 may transmit the first PUSCH communication and the second PUSCH communication currently (e.g., using spatial division multiplexing or frequency division multiplexing) or non-concurrently (e.g., using time division multiplexing). In some other aspects, the UE 120 may transmit only the first PUSCH communication or only the second PUSCH communication.

The first PUSCH communication may be scheduled by first downlink control information (DCI) received by the UE 120 in a first control resource set (CORESET 1), and the second PUSCH communication may be scheduled by second DCI received by the UE 120 in a second CORESET (CORESET 2). In some aspects, the first TRP 505 and the second TRP 505 may respectively transmit the first DCI and the second DCI. In some aspects, one of the first TRP 505 or the second TRP 505 may transmit both of the first DCI and the second DCI.

In current wireless networks, a UE may be configured with a single PUSCH configuration for uplink communication (e.g., for multi-panel uplink transmissions). However, the single PUSCH configuration is not optimized for multi-panel uplink transmissions to multiple TRPs. For example, the single PUSCH configuration may not be optimized for when the UE is communicating with a first TRP, that is located closer to the UE, and a second TRP that is located further from the UE. As another example, the single PUSCH configuration may not be optimized for when the UE is communicating with a first TRP, that provides DL and UL coverage, and a second TRP that provides only UL coverage. Accordingly, the UE may use more processing resources or battery resources, may communicate with less throughput, and/or the like, when using a single PUSCH configuration for multi-panel uplink transmissions. Some techniques and apparatuses described herein enable a UE to be configured with multiple PUSCH configurations for use in multi-panel uplink transmissions.

As indicated above, FIG. 5 is provided as an example. Other examples may differ from what is described with respect to FIG. 5.

Figure 6A:
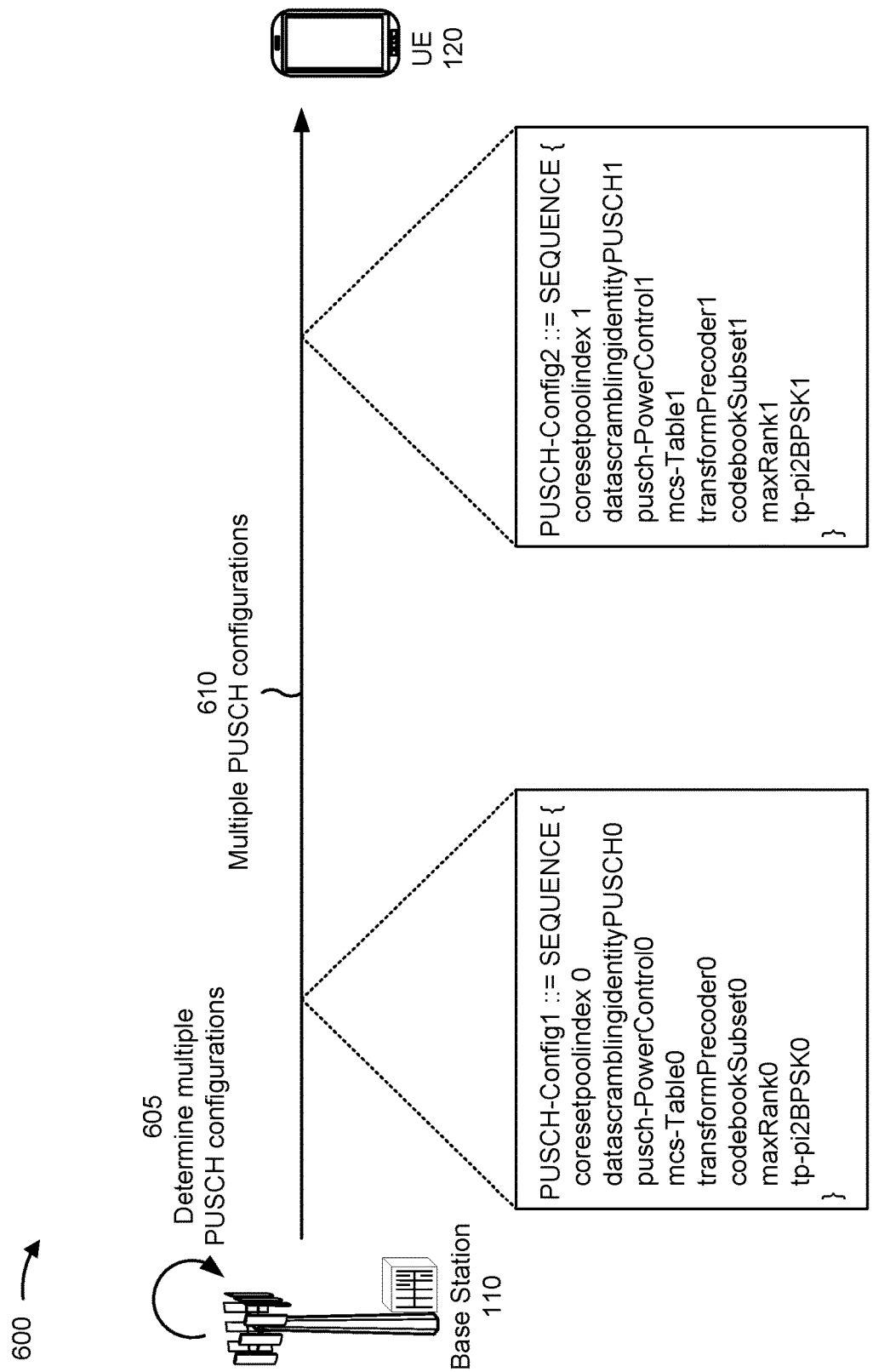
FIGS. 6A and 6B are diagrams illustrating examples associated with multiple uplink configurations for multiple antenna panel transmissions, in accordance with various aspects of the present disclosure.
Figure 6B:
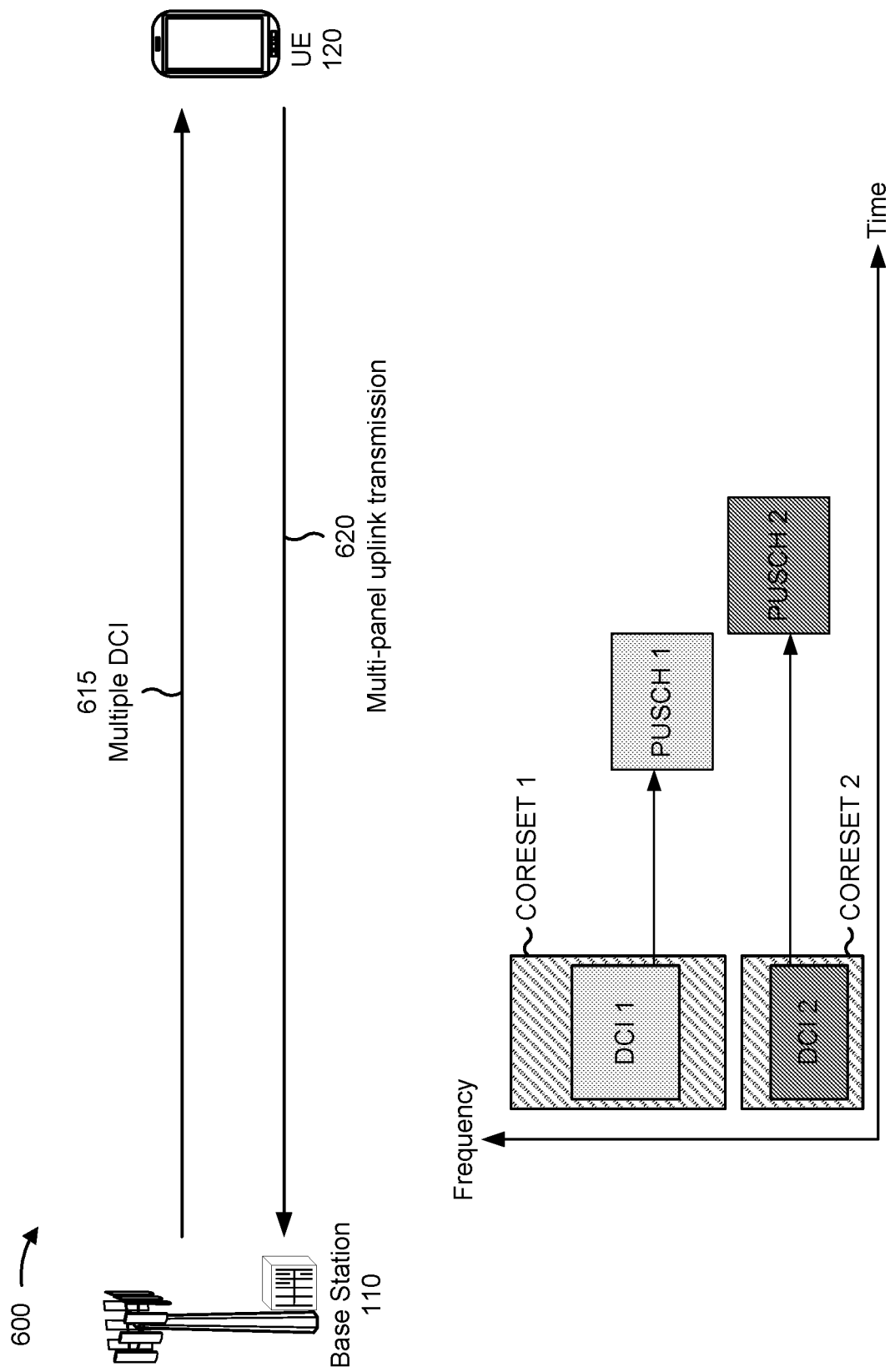

FIGS. 6A and 6B are diagrams illustrating an example 600 of multiple uplink configurations for multiple antenna panel transmissions, in accordance with various aspects of the present disclosure. As shown in FIG. 6A, a base station 110 and a UE 120 may communicate with one another. In some aspects, the base station 110 may include the first TRP 505 and the second TRP 505 described above in connection with FIG. 5. In some aspects, the base station 110 may correspond to a TRP 505 (e.g., the first TRP 505 or the second TRP 505) described above in connection with FIG. 5. In some aspects, the first TRP 505 may be associated with a first base station 110, and the second TRP 505 may be associated with a second base station 110.

As shown in FIG. 6A, and by reference number 605, the base station 110 may determine multiple PUSCH configurations (e.g., uplink configurations) for the UE 120. For example, the base station 110 may determine a first PUSCH configuration and a second PUSCH configuration for the UE 120. The multiple PUSCH configurations may be in a bandwidth part for the same serving cell. For example, the first TRP 505 and the second TRP 505 may be associated with the same serving cell (e.g., the same serving cell identifier).

As shown by reference number 610, the base station 110 may transmit (e.g., via radio resource control (RRC) signaling), and the UE 120 may receive, the multiple PUSCH configurations. For example, the first TRP 505 may transmit the first PUSCH configuration and the second TRP 505 may transmit the second PUSCH configuration. As another example, a TRP 505 may transmit both the first PUSCH configuration and the second PUSCH configuration.

In some aspects, the first PUSCH configuration and the second PUSCH configuration may be different. For example, one or more parameters indicated by the first PUSCH configuration may be different from one or more parameters indicated by the second PUSCH configuration.

As shown in FIG. 6A, in some aspects, the first PUSCH configuration may be associated with a first panel identifier, and the second PUSCH configuration may be associated with a second panel identifier. In some aspects, a panel identifier may be a CORESET pool index value. In other words, the first PUSCH configuration may indicate a first CORESET pool index value (e.g., associated with a first CORESET) and the second PUSCH configuration may indicate a second CORESET pool index value (e.g., associated with a second CORESET). The first CORESET pool index value may be one of 0 or 1, and the second CORESET pool index value may be the other of 0 or 1. In some aspects, a panel identifier may additionally, or alternatively, be a sounding reference signal (SRS) resource indicator, an SRS resource set indicator, an uplink spatial relation information indicator, or an uplink TCI state indicator.

In some aspects, the first PUSCH configuration may indicate a first data scrambling identity (e.g., dataScramblingIdentityPUSCH), and the second PUSCH configuration may indicate a second data scrambling identity (e.g., different from the first data scrambling identity). In this way, randomization of interference between multiple PUSCH transmissions may be improved. In some aspects, the first PUSCH configuration may indicate a first power control configuration (e.g., pusch-PowerControl), and the second PUSCH configuration may indicate a second power control configuration (e.g., different from the first power control configuration). For example, one or more parameters (e.g., a p0 value, a closed loop index, a pathloss reference signal identifier, and/or the like) indicated by the first power control configuration may be different from one or more parameters indicated by the second power control configuration. In this way, power control parameters may be optimized for each target TRP 505.

In some aspects, the first PUSCH configuration may indicate a first MCS table, and the second PUSCH configuration may indicate a second MCS table (e.g., different from the first MCS table). For example, the first MCS table and the second MCS table may be associated with different modulation types, different transform precodings, and/or the like. As another example, one or more MCSs mapped by the first MCS table may be different from one or more MCSs mapped by the second MCS table. That is, one or more MCSs mapped by the first MCS table and one or more MCSs mapped by the second MCS table may include different modulation orders, different target code rates, different spectral efficiencies, and/or different combinations of modulation order, target code rate, and spectral efficiency.

In some aspects, the first PUSCH configuration may indicate a first transform precoder (e.g., transformPrecoder) indication, and the second PUSCH configuration may indicate a second transform precoder indication (e.g., different from the first transform precoder indication). For example, the first transform precoder indication may be one of enabled or disabled, and the second transform precoder indication may be the other of enabled or disabled. As an example, the first PUSCH configuration (e.g., used for transmission to the first TRP 505) may enable a transform precoder, and the second PUSCH configuration (e.g., used for transmission to the second TRP 505) may disable a transform precoder. DFT-s-OFDM may be used for a PUSCH transmission when a transform precoder is enabled for the PUSCH transmission, and CP-OFDM may be used for a PUSCH transmission when a transform precoder is disabled for the PUSCH transmission.

In some aspects, the first PUSCH configuration may indicate a first codebook subset type (e.g., codebookSubset), and the second PUSCH configuration may indicate a second codebook subset type (e.g., different from the first codebook subset type). The first codebook subset type or the second codebook subset type may be one of: non-coherence; partial coherence and non-coherence; or full coherence, partial coherence, and non-coherence. In some aspects, the first PUSCH configuration may indicate a first maximum rank (e.g., maxRank), and the second PUSCH configuration may indicate a second maximum rank (e.g., different from the first maximum rank). A maximum rank may indicate a maximum quantity of transmission layers that are to be used. For example, the first maximum rank or the second maximum rank may have a value of 1, 2, 3, or 4. As an example, the first PUSCH configuration (e.g., used for transmission to the first TRP 505) may indicate a maximum rank of 1, and the second PUSCH configuration (e.g., used for transmission to the second TRP 505) may indicate a maximum rank of 4. In some aspects, the first PUSCH configuration may indicate a first uplink transmission scheme, and the second PUSCH configuration may indicate a second uplink transmission scheme (e.g., different from the first uplink transmission scheme). An uplink transmission scheme may be one of codebook based MIMO transmission or non-codebook based MIMO transmission.

In some aspects, the first PUSCH configuration may indicate a first pi/2 binary phase shift keying (BPSK) indication (e.g., tp-pi2BPSK), and the second PUSCH configuration may indicate a second pi/2 BPSK indication (e.g., different from the first pi/2 BPSK indication). For example, the first pi/2 BPSK indication may be one of enabled or disabled, and the second pi/2 BPSK indication may be the other of enabled or disabled. In some aspects, a target code rate used for an MCS may be dependent upon a pi/2 BPSK indication (e.g., a transmit precoder pi/2 BPSK indication). For example, if pi/2 BPSK is enabled, the target code rate may be calculated using a first value, and if pi/2 BPSK is disabled, the target code rate may be calculated using a second value.

As shown in FIG. 6B, and by reference number 615, the base station 110 may transmit, and the UE 120 may receive, multiple DCI that schedule multiple uplink communications of the UE 120 (e.g., multi-panel uplink transmissions). For example, the base station 110 may transmit first DCI (DCI 1), that schedules a first uplink communication (PUSCH 1), and second DCI (DCI 2), that schedules a second uplink communication (PUSCH 2), to the UE 120. In some aspects, the first TRP 505 may transmit the first DCI, and the second TRP 505 may transmit the second DCI. In some aspects, a TRP 505 may transmit both the first DCI and the second DCI.

The UE 120 may receive the first DCI for the first uplink communication in a first CORESET (CORESET 1) and the second DCI for the second uplink communication in a second CORESET (CORESET 2). The first CORESET may be associated with a first CORESET pool index value (e.g., 0), and the second CORESET may be associated with a second CORESET pool index value (e.g., 1).

Accordingly, the UE 120 may determine the PUSCH configuration (e.g., the first PUSCH configuration or the second PUSCH configuration) that is to be used for an uplink communication (e.g., the first uplink communication or the second uplink communication) based at least in part on whether the PUSCH configuration indicates the same CORESET pool index value as the CORESET in which the DCI for the uplink communication is received. For example, if DCI scheduling an uplink communication is received in a CORESET associated with a CORESET pool index value of 1, then the UE 120 may determine that the uplink communication is to use the PUSCH configuration that indicates a CORESET pool index value of 1.

As shown by reference number 620, the UE 120 may transmit multiple uplink communications using different antenna panels. For example, the UE 120 may use a first antenna panel to transmit the first uplink communication to the first TRP 505, and use a second antenna panel to transmit the second uplink communication to the second TRP 505. An antenna panel may include a group of antenna ports, and may be identified by an explicit panel identifier or an implicit resource identifier, such as a reference signal identifier, a TCI identifier, and/or the like. The UE 120 may transmit the first uplink communication and the second uplink communication concurrently (e.g., using spatial division multiplexing or frequency division multiplexing) or non-concurrently (e.g., using time division multiplexing).

In some aspects, the UE 120 may transmit the first uplink communication according to the first PUSCH configuration (or the second PUSCH configuration) based at least in part on a determination that the first uplink communication was scheduled by DCI received in a CORESET associated with the same CORESET pool index value that is indicated by the first PUSCH configuration (or the second PUSCH configuration). Similarly, the UE 120 may transmit the second uplink communication according to the second PUSCH configuration (or the first PUSCH configuration) based at least in part on a determination that the second uplink communication was scheduled by DCI received in a CORESET associated with the same CORESET pool index value that is indicated by the second PUSCH configuration (or the first PUSCH configuration).

As indicated above, FIGS. 6A and 6B are provided as one or more examples. Other examples may differ from what is described with respect to FIGS. 6A and 6B.

Figure 7:
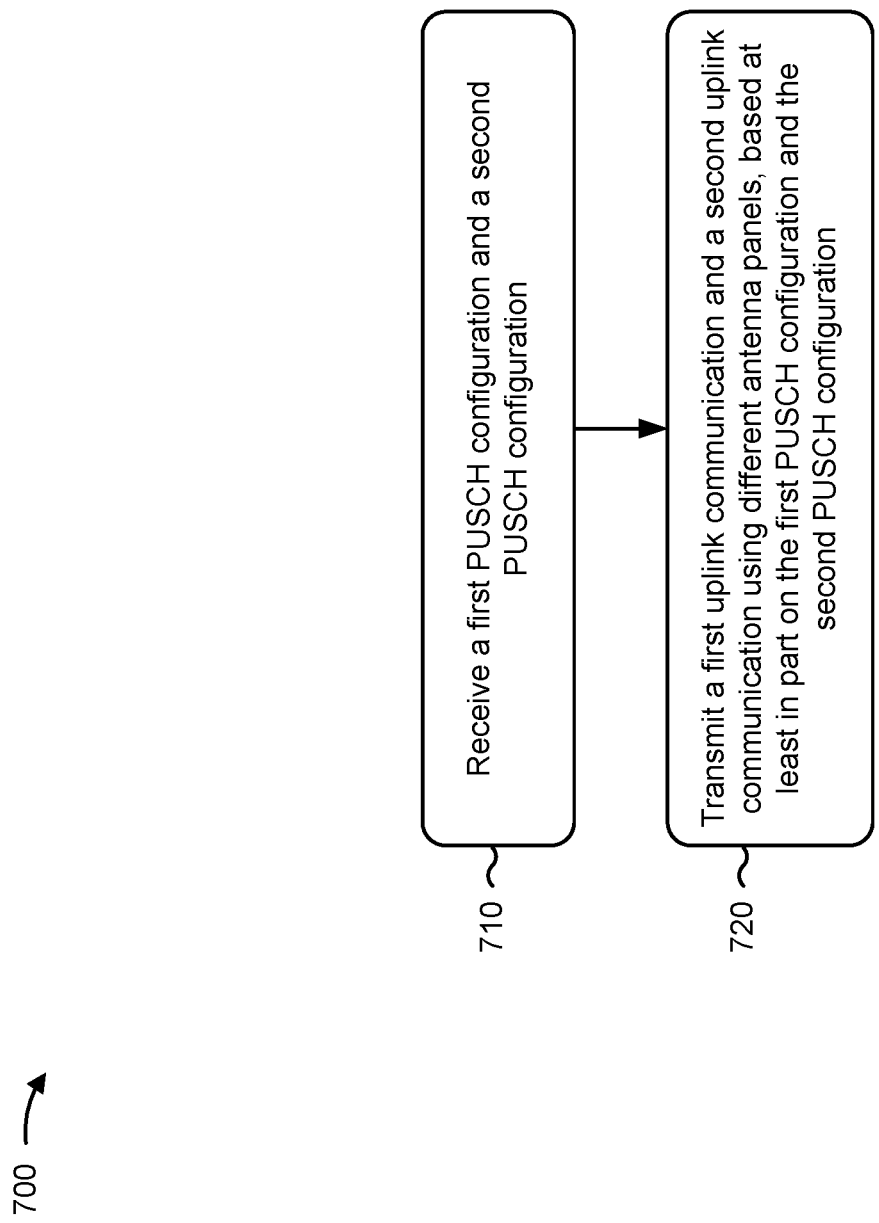
FIGS. 7 and 8 are diagrams illustrating example processes associated with multiple uplink configurations for multiple antenna panel transmissions, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with multiple uplink configurations for multiple antenna panel transmissions.

As shown in FIG. 7, in some aspects, process 700 may include receiving a first PUSCH configuration and a second PUSCH configuration (block 710). For example, the UE (e.g., using antenna 252, DEMOD 254, MIMO detector 256, receive processor 258, controller/processor 280, and/or the like) may receive a first PUSCH configuration and a second PUSCH configuration, as described above.

As further shown in FIG. 7, in some aspects, process 700 may include transmitting a first uplink communication and a second uplink communication using different antenna panels, based at least in part on the first PUSCH configuration and the second PUSCH configuration (block 720). For example, the UE (e.g., using controller/processor 280, transmit processor 264, TX MIMO processor 266, MOD 254, antenna 252, and/or the like) may transmit a first uplink communication and a second uplink communication using different antenna panels, based at least in part on the first PUSCH configuration and the second PUSCH configuration, as described above.

Process 700 may include additional aspects, such as any single aspect or any combination of aspects described below and/or in connection with one or more other processes described elsewhere herein.

In a first aspect, the first uplink communication is transmitted to a first TRP and the second uplink communication is transmitted to a second TRP, and the first TRP and the second TRP are associated with a same serving cell.

In a second aspect, alone or in combination with the first aspect, the first PUSCH configuration indicates a first control resource set pool index value, and the second PUSCH configuration indicates a second control resource set pool index value.

In a third aspect, alone or in combination with one or more of the first and second aspects, process 700 includes receiving first DCI for the first uplink communication in a first CORESET associated with a first CORESET pool index value, and second DCI for the second uplink communication in a second CORESET associated with a second CORESET pool index value.

In a fourth aspect, alone or in combination with one or more of the first through third aspects, transmitting the first uplink communication and the second uplink communication includes transmitting the first uplink communication according to the first PUSCH configuration based at least in part on a determination that the first PUSCH configuration indicates the first CORESET pool index value, and the second uplink communication according to the second PUSCH configuration based at least in part on a determination that the second PUSCH configuration indicates the second CORESET pool index value.

In a fifth aspect, alone or in combination with one or more of the first through fourth aspects, the first PUSCH configuration indicates a first data scrambling identity, and the second PUSCH configuration indicates a second data scrambling identity.

In a sixth aspect, alone or in combination with one or more of the first through fifth aspects, the first PUSCH configuration indicates a first power control configuration, and the second PUSCH configuration indicates a second power control configuration.

In a seventh aspect, alone or in combination with one or more of the first through sixth aspects, the first PUSCH configuration indicates a first MCS table, and the second PUSCH configuration indicates a second MCS table.

In an eighth aspect, alone or in combination with one or more of the first through seventh aspects, the first PUSCH configuration indicates a first transform precoder indication, and the second PUSCH configuration indicates a second transform precoder indication.

In a ninth aspect, alone or in combination with one or more of the first through eighth aspects, the first PUSCH configuration indicates a first codebook subset type, and the second PUSCH configuration indicates a second codebook subset type.

In a tenth aspect, alone or in combination with one or more of the first through ninth aspects, the first PUSCH configuration indicates a first maximum rank, and the second PUSCH configuration indicates a second maximum rank.

In an eleventh aspect, alone or in combination with one or more of the first through tenth aspects, the first PUSCH configuration indicates a first pi/2 BPSK indication, and the second PUSCH configuration indicates a second pi/2 BPSK indication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
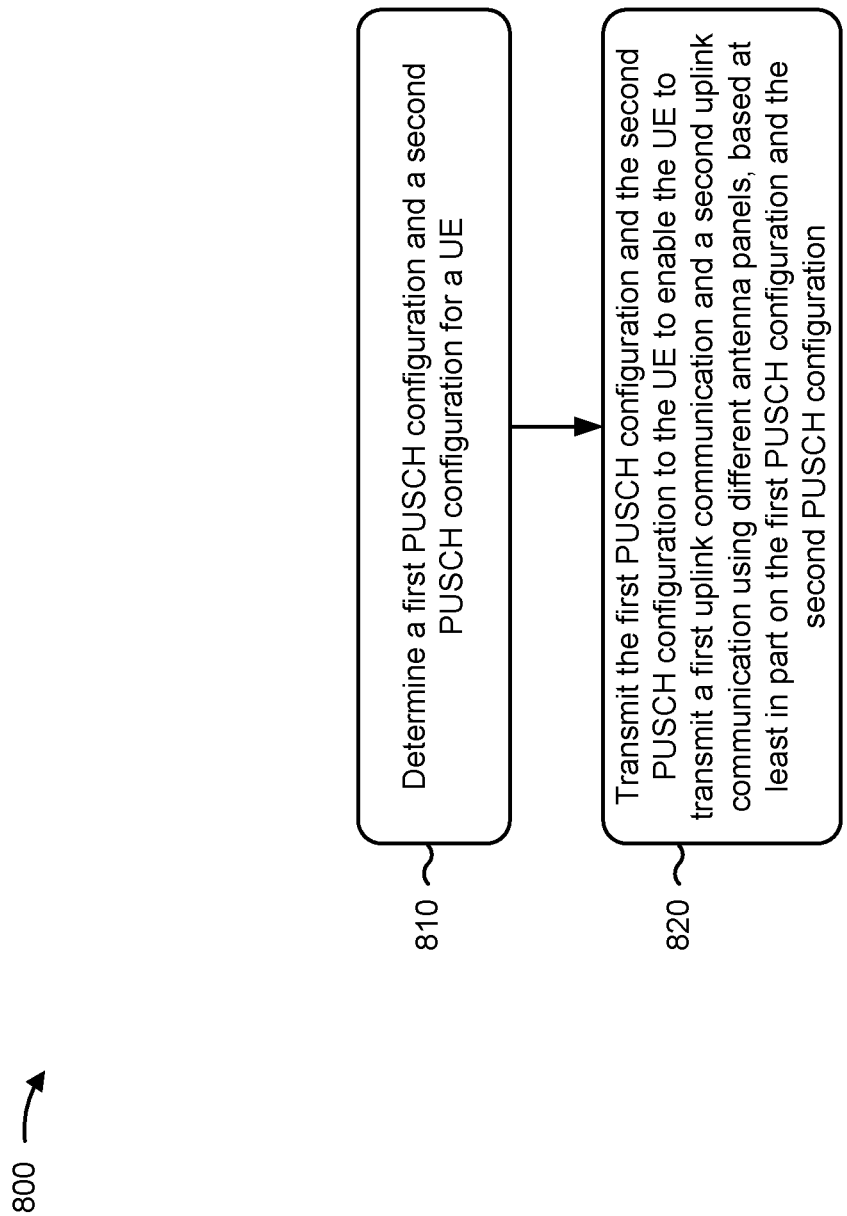

FIG. 8 is a diagram illustrating an example process 800 performed, for example, by a base station, in accordance with various aspects of the present disclosure. Example process 800 is an example where the base station (e.g., base station 110 and/or the like) performs operations associated with multiple uplink configurations for multiple antenna panel transmissions.

As shown in FIG. 8, in some aspects, process 800 may include determining a first PUSCH configuration and a second PUSCH configuration for a UE (block 810). For example, the base station (e.g., using controller/processor 240 and/or the like) may determine a first PUSCH configuration and a second PUSCH configuration for a UE, as described above.

As further shown in FIG. 8, in some aspects, process 800 may include transmitting the first PUSCH configuration and the second PUSCH configuration to the UE to enable the UE to transmit a first uplink communication and a second uplink communication using different antenna panels, based at least in part on the first PUSCH configuration and the second PUSCH configuration (block 820). For example, the base station (e.g., using controller/processor 240, transmit processor 220, TX MIMO processor 230, MOD 232, antenna 234, and/or the like) may transmit the first PUSCH configuration and the second PUSCH configuration to the UE to enable the UE to transmit a first uplink communication and a second uplink communication using different antenna panels, based at least in part on the first PUSCH configuration and the second PUSCH configuration, as described above.

Process 800 may include additional aspects, such as any single aspect or any combination of aspects described below and/or in connection with one or more other processes described elsewhere herein.

In a first aspect, the first uplink communication is to be transmitted by the UE to a first TRP and the second uplink communication is to be transmitted by the UE to a second TRP, and the first TRP and the second TRP are associated with a same serving cell.

In a second aspect, alone or in combination with the first aspect, the first PUSCH configuration indicates a first CORESET pool index value, and the second PUSCH configuration indicates a second CORESET pool index value.

In a third aspect, alone or in combination with one or more of the first and second aspects, process 800 includes transmitting first DCI for the first uplink communication in a first CORESET associated with a first CORESET pool index value, and second DCI for the second uplink communication in a second CORESET associated with a second CORESET pool index value.

In a fourth aspect, alone or in combination with one or more of the first through third aspects, the UE is to transmit the first uplink communication according to the first PUSCH configuration if the first PUSCH configuration indicates the first CORESET pool index value, and the second uplink communication according to the second PUSCH configuration if the second PUSCH configuration indicates the second CORESET pool index value.

In a fifth aspect, alone or in combination with one or more of the first through fourth aspects, the first PUSCH configuration indicates a first data scrambling identity, and the second PUSCH configuration indicates a second data scrambling identity.

In a sixth aspect, alone or in combination with one or more of the first through fifth aspects, the first PUSCH configuration indicates a first power control configuration, and the second PUSCH configuration indicates a second power control configuration.

In a seventh aspect, alone or in combination with one or more of the first through sixth aspects, the first PUSCH configuration indicates a first MCS table, and the second PUSCH configuration indicates a second MCS table.

In an eighth aspect, alone or in combination with one or more of the first through seventh aspects, the first PUSCH configuration indicates a first transform precoder indication, and the second PUSCH configuration indicates a second transform precoder indication.

In a ninth aspect, alone or in combination with one or more of the first through eighth aspects, the first PUSCH configuration indicates a first codebook subset type, and the second PUSCH configuration indicates a second codebook subset type.

In a tenth aspect, alone or in combination with one or more of the first through ninth aspects, the first PUSCH configuration indicates a first maximum rank, and the second PUSCH configuration indicates a second maximum rank.

In an eleventh aspect, alone or in combination with one or more of the first through tenth aspects, the first PUSCH configuration indicates a first pi/2 BPSK indication, and the second PUSCH configuration indicates a second pi/2 BPSK indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a first physical uplink shared channel (PUSCH) configuration and a second PUSCH configuration, wherein the first PUSCH configuration indicates a first control resource set (CORESET) pool index value, wherein the second PUSCH configuration indicates a second CORESET pool index value, and wherein one or more additional parameters indicated by the first PUSCH configuration are different from one or more additional parameters indicated by the second PUSCH configuration;
   receiving, in a first CORESET associated with the first CORESET pool index value, first downlink control information (DCI) scheduling resources for the first uplink communication;
   receiving, in a second CORESET associated with the second CORESET pool index value, second DCI scheduling resources for the second uplink communication;
   transmitting the first uplink communication using a first antenna panel and according to the first PUSCH configuration based at least in part on the first PUSCH configuration indicating the first CORESET pool index value and the first CORESET, in which the first DCI for the first uplink communication is received, being associated with the first CORESET pool index value; and
   transmitting the second uplink communication using a second antenna panel and according to the second PUSCH configuration based at least in part on the second PUSCH configuration indicating the second CORESET pool index value and the second CORESET, in which the second DCI for the second uplink communication is received, being associated with the second CORESET pool index value.

2. The method of claim 1, wherein the first uplink communication is transmitted to a first transmit receive point (TRP) and the second uplink communication is transmitted to a second TRP, and
   wherein the first TRP and the second TRP are associated with a same serving cell.

3. The method of claim 1, wherein the first PUSCH configuration indicates a first data scrambling identity, and the second PUSCH configuration indicates a second data scrambling identity different from the first data scrambling identity.

4. The method of claim 1, wherein the first PUSCH configuration indicates a first power control configuration, and the second PUSCH configuration indicates a second power control configuration different from the first power control configuration.

5. The method of claim 1, wherein the first PUSCH configuration indicates a first modulation and coding scheme (MCS) table, and the second PUSCH configuration indicates a second MCS table different from the first MCS table.

6. The method of claim 1, wherein the first PUSCH configuration indicates a first transform precoder indication, and the second PUSCH configuration indicates a second transform precoder indication different from the first transform precoder indication.

7. The method of claim 1, wherein the first PUSCH configuration indicates a first codebook subset type, and the second PUSCH configuration indicates a second codebook subset type different from the first codebook subset type.

8. The method of claim 1, wherein the first PUSCH configuration indicates a first maximum rank, and the second PUSCH configuration indicates a second maximum rank different from the first maximum rank.

9. The method of claim 1, wherein the first PUSCH configuration indicates a first pi/2 binary phase shift keying (BPSK) indication, and the second PUSCH configuration indicates a second pi/2 BPSK indication different from the first pi/2 BPSK indication.

10. A method of wireless communication performed by a base station, comprising:
    determining a first physical uplink shared channel (PUSCH) configuration and a second PUSCH configuration for a user equipment (UE), wherein the first PUSCH configuration indicates a first control resource set (CORESET) pool index value, wherein the second PUSCH configuration indicates a second CORESET pool index value, and wherein one or more additional parameters indicated by the first PUSCH configuration are different from one or more additional parameters indicated by the second PUSCH configuration;
    transmitting the first PUSCH configuration and the second PUSCH configuration to the UE to enable the UE to transmit a first uplink communication and a second uplink communication using different antenna panels, based at least in part on the first PUSCH configuration and the second PUSCH configuration;
    transmitting, in a first CORESET associated with the first CORESET pool index value, first downlink control information (DCI) scheduling resources for the first uplink communication, wherein the first DCI schedules the UE to transmit the first uplink communication using a first antenna panel and according to the first PUSCH configuration based at least in part on the first PUSCH configuration indicating the first CORESET pool index value and the first CORESET being associated with the first CORESET pool index value; and
    transmitting, in a second CORESET associated with the second CORESET pool index value, second DCI scheduling resources for the second uplink communication, wherein the second DCI schedules the UE to transmit the second uplink communication using a second antenna panel and according to the second PUSCH configuration based at least in part on the second PUSCH configuration indicating the second CORESET pool index value and the second CORESET being associated with the second CORESET pool index value.

11. The method of claim 10, wherein the first uplink communication is to be transmitted by the UE to a first transmit receive point (TRP) and the second uplink communication is to be transmitted by the UE to a second TRP, and
    wherein the first TRP and the second TRP are associated with a same serving cell.

12. The method of claim 10, wherein the first PUSCH configuration indicates a first data scrambling identity, and the second PUSCH configuration indicates a second data scrambling identity different from the first data scrambling identity.

13. The method of claim 10, wherein the first PUSCH configuration indicates a first power control configuration, and the second PUSCH configuration indicates a second power control configuration different from the first power control configuration.

14. The method of claim 10, wherein the first PUSCH configuration indicates a first modulation and coding scheme (MCS) table, and the second PUSCH configuration indicates a second MCS table different from the first MCS table.

15. The method of claim 10, wherein the first PUSCH configuration indicates a first transform precoder indication, and the second PUSCH configuration indicates a second transform precoder indication different from the first transform precoder indication.

16. The method of claim 10, wherein the first PUSCH configuration indicates a first codebook subset type, and the second PUSCH configuration indicates a second codebook subset type different from the first codebook subset type.

17. The method of claim 10, wherein the first PUSCH configuration indicates a first maximum rank, and the second PUSCH configuration indicates a second maximum rank different from the first maximum rank.

18. The method of claim 10, wherein the first PUSCH configuration indicates a first pi/2 binary phase shift keying (BPSK) indication, and the second PUSCH configuration indicates a second pi/2 BPSK indication different from the first pi/2 BPSK indication.

19. A user equipment (UE) for wireless communication, comprising:
    memory; and
    one or more processors coupled to the memory, the one or more processors configured to cause the UE to:
    receive a first physical uplink shared channel (PUSCH) configuration and a second PUSCH configuration, wherein the first PUSCH configuration indicates a first control resource set (CORESET) pool index value, wherein the second PUSCH configuration indicates a second CORESET pool index value, and wherein one or more additional parameters indicated by the first PUSCH configuration are different from one or more additional parameters indicated by the second PUSCH configuration;
    receive, in a first CORESET associated with the first CORESET pool index value, first downlink control information (DCI) scheduling resources for the first uplink communication;
    receive, in a second CORESET associated with the second CORESET pool index value, second DCI scheduling resources for the second uplink communication;
    transmit the first uplink communication using a first antenna panel and according to the first PUSCH configuration based at least in part on the first PUSCH configuration indicating the first CORESET pool index value and the first CORESET, in which the first DCI for the first uplink communication is received, being associated with the first CORESET pool index value; and transmit the second uplink communication using a second antenna panel and according to the second PUSCH configuration based at least in part on the second PUSCH configuration indicating the second CORESET pool index value and the second CORESET, in which the second DCI for the second uplink communication is received, being associated with the second CORESET pool index value.

20. A base station for wireless communication, comprising:

memory; and one or more processors coupled to the memory, the one or more processors configured to cause the base station to:

determine a first physical uplink shared channel (PUSCH) configuration and a second PUSCH configuration for a user equipment (UE), wherein the first PUSCH configuration indicates a first control resource set (CORESET) pool index value, wherein the second PUSCH configuration indicates a second CORESET pool index value, and wherein one or more additional parameters indicated by the first PUSCH configuration are different from one or more additional parameters indicated by the second PUSCH configuration;

transmit the first PUSCH configuration and the second PUSCH configuration to the UE to enable the UE to transmit a first uplink communication and a second uplink communication using different antenna panels, based at least in part on the first PUSCH configuration and the second PUSCH configuration;

transmit, in a first CORESET associated with the first CORESET pool index value, first downlink control information (DCI) scheduling resources for the first uplink communication, wherein the first DCI schedules the UE to transmit the first uplink communication using a first antenna panel and according to the first PUSCH configuration based at least in part on the first PUSCH configuration indicating the first CORESET pool index value and the first CORESET being associated with the first CORESET pool index value; and transmit, in a second CORESET associated with the second CORESET pool index value, second DCI scheduling resources for the second uplink communication, wherein the second DCI schedules the UE to transmit the second uplink communication using a second antenna panel and according to the second PUSCH configuration based at least in part on the second PUSCH configuration indicating the second CORESET pool index value and the second CORESET being associated with the second CORESET pool index value.

* * * * *